United States Patent [19]

Shimizu

[11] Patent Number: 4,691,237
[45] Date of Patent: Sep. 1, 1987

[54] IMAGE DATA PROCESSING APPARATUS ADAPTABLE TO OUTPUT DEVICES OF DIFFERENT TYPES

[75] Inventor: Haruo Shimizu, Yokohama, Japan
[73] Assignee: Canon Kabushiki Kaisha, Tokyo, Japan
[21] Appl. No.: 629,898
[22] Filed: Jul. 11, 1984
[30] Foreign Application Priority Data
  Jul. 18, 1983 [JP] Japan .................................. 58-129443
[51] Int. Cl.[4] .......................... H04N 1/00; H04N 1/36; H04N 1/40; H04N 1/04
[52] U.S. Cl. .................................... 358/256; 358/264; 358/280; 358/293; 358/286
[58] Field of Search ............... 358/264, 265, 280, 293, 358/294, 256, 285, 286, 268

[56] References Cited

U.S. PATENT DOCUMENTS 4,143,403  3/1979  Ohnishi ............................... 358/293
4,165,520  8/1979  Wessler et al. ....................... 358/280
4,345,276  8/1982  Colomb ............................... 358/280

Primary Examiner—Howard W. Britton
Assistant Examiner—John K. Peng
Attorney, Agent, or Firm—Fitzpatrick, Cella, Harper & Scinto

[57] ABSTRACT

A data image processing apparatus comprises an image data generator, a processor for processing the image data and a synchronization circuit for synchronizing the processor. A synchronization signal of the synchronization circuit is selectable.

24 Claims, 12 Drawing Figures

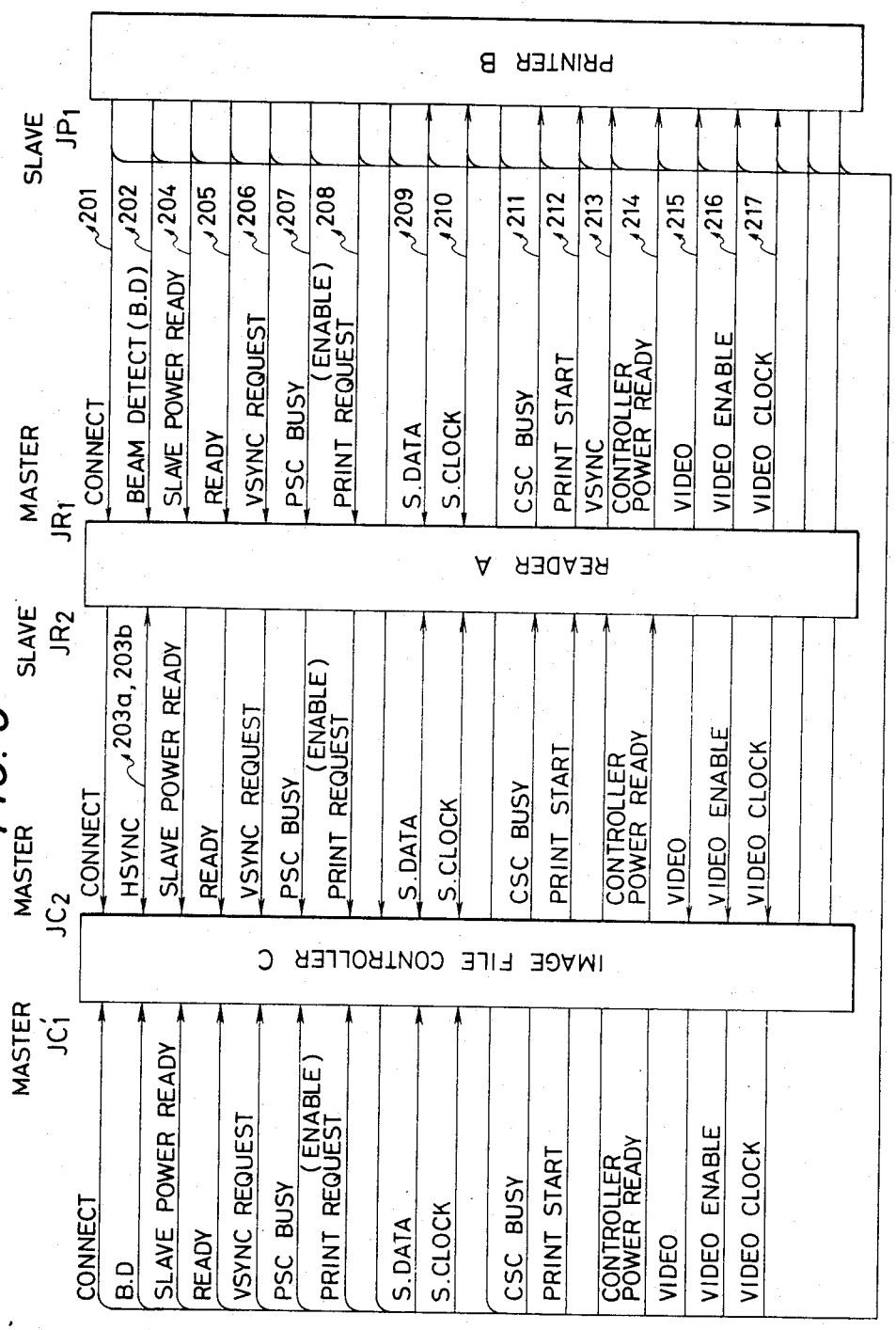

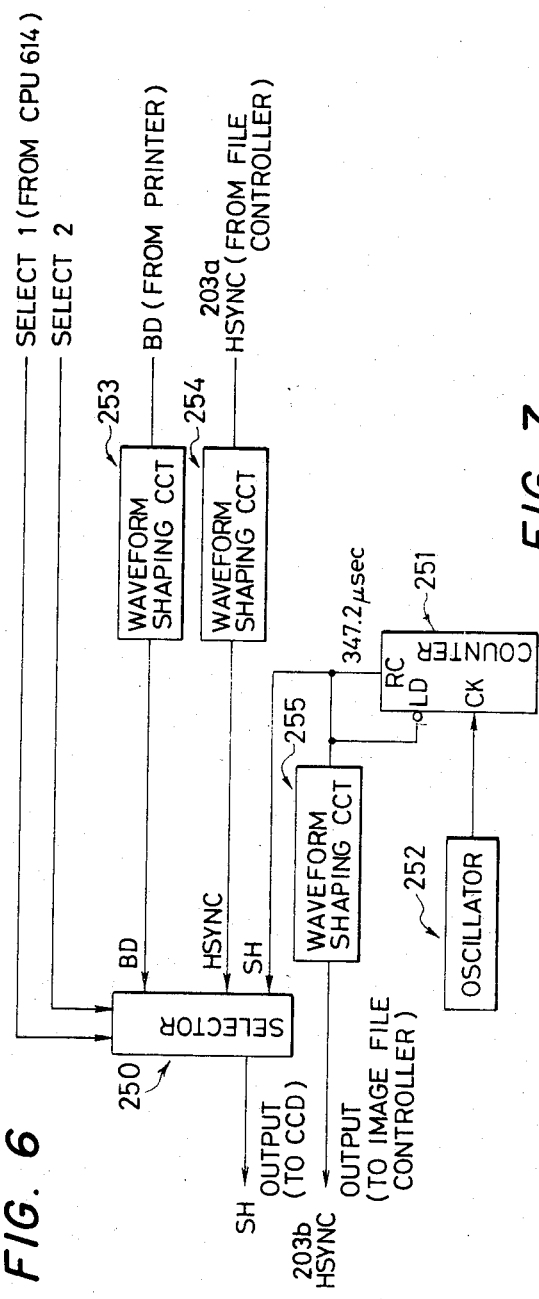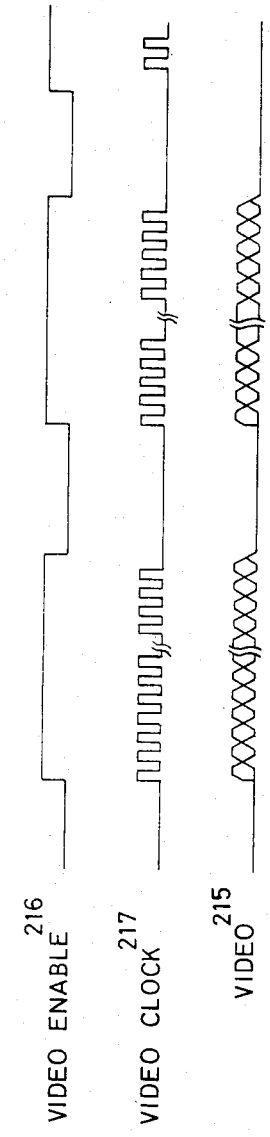

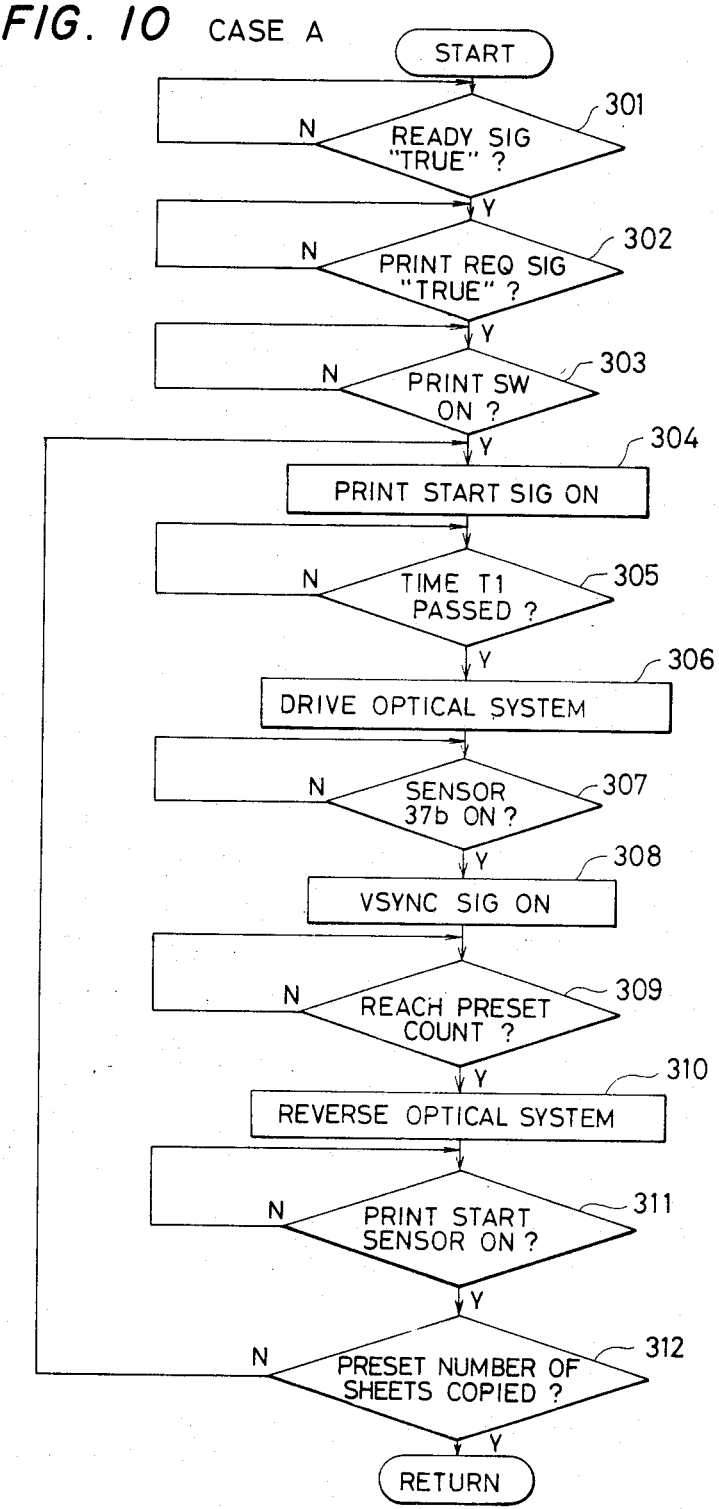
FIG. 10 CASE A

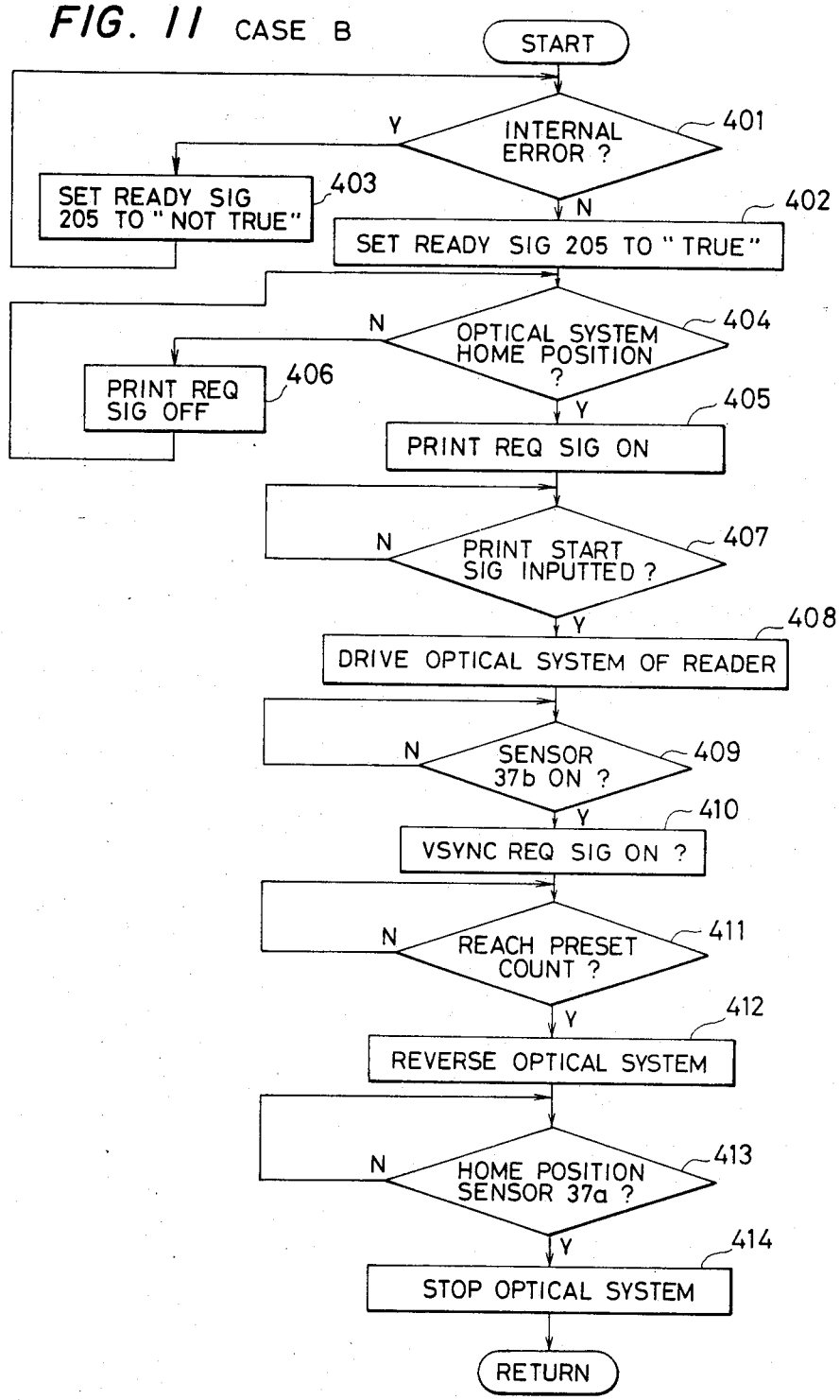

IMAGE DATA PROCESSING APPARATUS ADAPTABLE TO OUTPUT DEVICES OF DIFFERENT TYPES.

BACKGROUND OF THE INVENTION

1. Field of the Invention

The present invention relates to an image data processing apparatus, and more particularly to an image data generator which can be commonly used in apparatus of different input systems such as a digital copying machine, a facsimile and an image file.

2. Description of the Prior Art

In prior art image readers having no page memory, image information read is sent out in real time by a CCD (charge coupled device). In a modern digital copying machine, the image reader starts a recorder when a copy is to be recorded so that the image information in sent out is synchronism with a signal from the recorder.

In an image file system, an image file controller starts the image reader when the image information is to be required so that it is filed in response to a synchronizing signal from the image reader.

In such systems, the image information is sent out by the horizontal synchronization signal from the recorder, the horizontal synchronization signal from the image reader or the horizontal synchronization signal from the image file controller, and the image reading is started by the image reader or the image read controller. Accordingly, different image readers are used for the digital copying machine and the file systems. Thus, costs are increased and additional space is required.

SUMMARY OF THE INVENTION

It is an object of the present invention to provide an image data generator adaptable to output devices of different types.

It is another object of the present invention to provide an image data output apparatus connectable to output devices of different types.

It is another object of the present invention to provide an image reader having an improved interface.

It is another object of the present invention to provide an image reader adaptable to a digital copying machine system and an image filing system so that two systems can be attained with one reader.

It is another object of the present invention to provide an image processing system having an image data generator shared by a plurality of interfaces to resolve problems in cost and space of the image processing system.

It is another object of the present invention to provide an image reader which can be used either in a master mode or in a slave mode.

It is another object of the present invention to provide an image processing apparatus having means for reading image information by an image sensor and sending it to an external device, in which vertical synchronization or start of the image information is controlled either by a signal from the external device or by a signal generated within the apparatus itself.

It is another object of the present invention to provide an image processing apparatus in which horizontal synchronization of image information is controlled either by a signal from an external device or by a signal generated within the apparatus itself.

It is an other object of the present invention to provide an image processing apparatus in which control of horizontal or vertical synchronization is selected by a switch on a control panel of an image reader or by a connection with an external device.

The above and other objects of the present invention will be apparent from the following description of the invention.

BRIEF DESCRIPTION OF THE DRAWINGS

FIGS. 1 to 11 show embodiment of the present invention in which;

FIG. 1 is a system diagram around an image reader,

FIG. 2 shows a sectional view of the image reader and a printer,

FIG. 4 is a system block diagram of the image reader, FIG. 5 is a block diagram of an interface for the image reader, FIG. 6 is a block diagram of a horizontal synchronization circuit, FIG. 7 is a timing chart of the horizontal synchronization, FIG. 8 shows a timing of a protocol of the interface, FIG. 9 illustrates a movement of an optical system, and FIGS. 10 and 11 show flow charts of control sequences.

DETAILED DESCRIPTION OF THE PREFERRED EMBODIMENTS

Constructions and functions of one embodiment of the present invention are now explained with reference to FIGS. 1–11.

Figure 1:
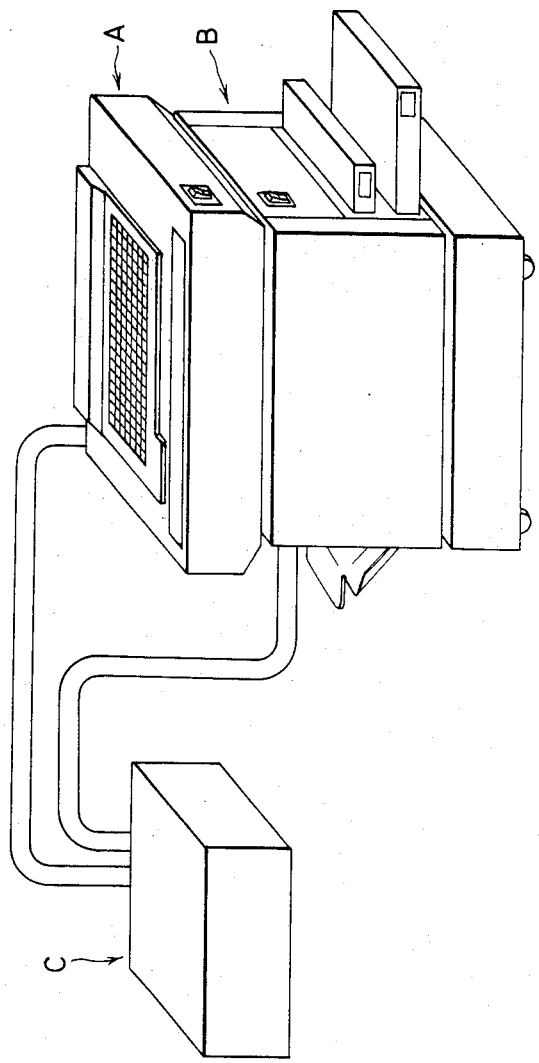
Figure 2:
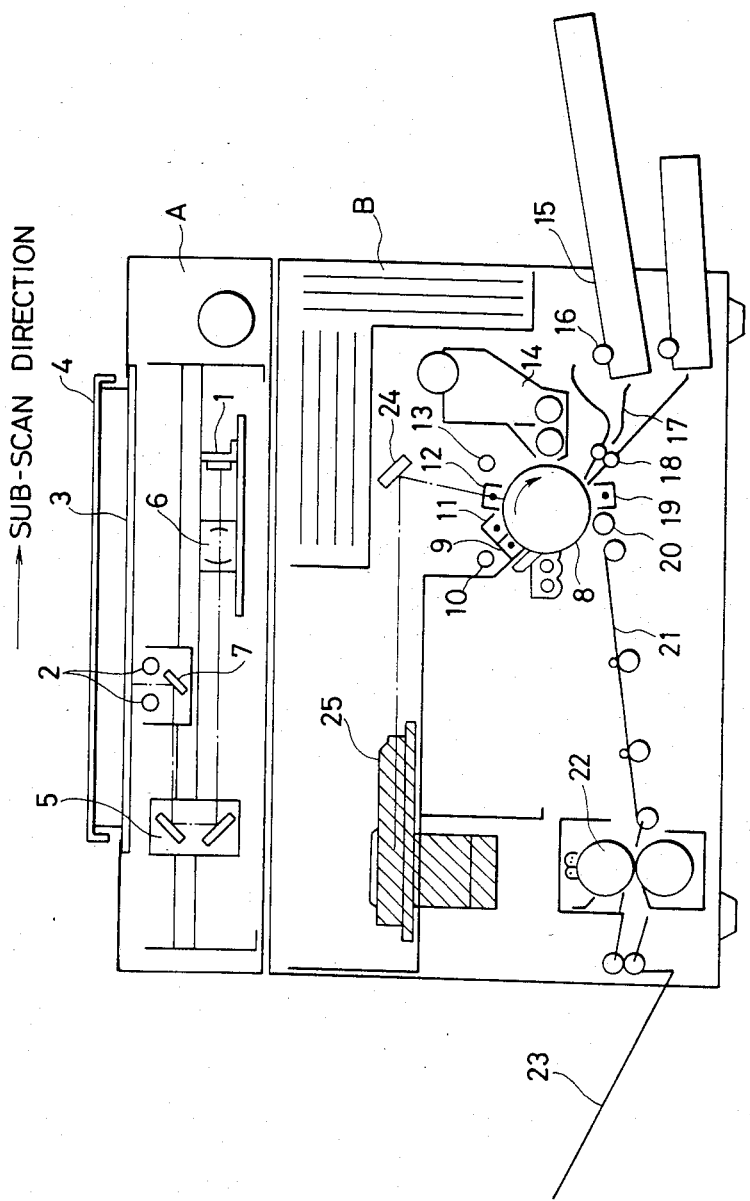

FIG. 1 is a system diagram around an image reader in the present embodiment. The system basically comprises an image reader A, a printer B and an image file controller C. Those units are separated both physically and functionally so that they can be used individually. The interconnection among the units are attained by electrical cables FIG. 2 shows a sectional view of the reader A and the printer B.

An original sheet in placed, face down, on an original sheet glass 3 having a mounting reference at an inner left corner as viewed from the front of the unit. The original sheet 3 is pressed to the glass 3 by an original sheet cover 4. The original sheet 3 is illuminated by a fluoresent lamp 2 and a light reflected therefrom is focused on a plane of a CCD 1 through mirrors 5 and 7 and a lens 6. The mirrors 7 and 5 are moved at a relative velocity of 2/1. The optical unit is moved from left to right in the drawing at a constant speed through a PLL (phase locked loop) by a DC servo motor. The speed is 180 mm/s in a forward run and 468 mm/s in a backward run. A resolution in a sub-scan direction is 16 lines/mm. A size of original sheet which can be handled is A5–A3 and an orientation of the original sheet is longitudinal for the sizes A5, B5 and A4 and lateral for the sizes B4 and A3. The optical unit has three return positions for various sizes of the original sheet. The first point which is common to the sizes A5, B5 and A4 is located at 220 mm from the original sheet reference position, the second point for the size B4 is located at 364 mm from the reference position, and the third point for the size A3 is located at 431.8 mm from the reference position.

A main scan width is determined by the orientation of the original sheet and it is 297 mm at maximum which is equal to a lateral length of the size A4. In order to read it with a resolution of 16 pels/mm, 4752($=297\times16$) bits are required for the CCD. In the present embodiment, two 2628-bit CCD array sensors are serially arranged and parallelly driven (parallel read, serial output) (See FIG. 3a). Thus, for the conditions of 16 lines/mm and 180 mm/s, a main scan period T (storage time of the CCD) is given by $$T = \frac{1}{v \cdot n} = \frac{1}{180 \times 16} = 347.2 \; \mu s.$$

A transfer rate of the CCD is given by $$f = \frac{N}{T} = \frac{2628}{347.2 \; \mu s} = 7.569 \; MHz.$$

Referring to FIG. 2, the printer B under the reader A now will be explained. The bit-serial image signal processed in the reader is applied to a laser scan optical unit 25 in the printer B. It comprises a semiconductor laser, a collimator lens, a rotating polygon mirror, an F-θ lens and a correction optical system. The image signal from the reader A is applied to the semiconductor laser which electro-optically converts the image singal to produce a laser beam, which is directed to the collimator lens to scan a photoconductive drum 8. The polygon mirror is rotated at 2600 rpm. A scan width there of is approximately 400 mm and an effective image width is 297 mm which is equal to the lateral length of the size A4. Accordingly, a frequency of a signal applied to the semiconductor laser is approximately 20 KHz (for NRZ). The laser beam from the optical unit is applied to the photoconductive drum 8 through a mirror 24.

The photoconductive drum 8 may have three layers, a conductive layer, a photoconductive layer and an insulative layer. Process components are arranged therearound to form an image. Numeral 9 denotes a pre-discharger, numeral 10 denotes a pre-discharge lamp, numeral 11 denotes a primary charger, numeral 12 denotes a secondary charger, numeral 13 denotes a flat exposure lamp, numeral 14 denotes a developing unit, numeral 15 denotes a paper cassette, numeral 16 denotes a paper feed roller, numeral 17 denotes a paper feed guide, numeral 18 denotes a registration roller, numeral 19 denotes a transfer charger, numeral 20 denotes a separation roller, numeral 21 denotes a convey guide, numeral 22 denotes a fixing unit and numeral 23 denotes a tray. The speeds of the photoconductive drum 8 and the convey system are 180 mm/s which is equal to the speed of the reader A in the forward run. Accordingly, the copy rate by the combination of the reader A and the printer B is 30 sheets/min for the size A4. The printer B uses a separation belt to separate the copy paper attached to the photoconductor drum. As a result, the image is blocked by the width of the belt. If the signal is on that belt width area, toners are deposited to the area by the development step and the separation belt is contaminated by the toners and the papers will also be contaminated. Accordingly, the reader A blocks the video signals of the print output for the separation belt width of 8 mm. Further, if the toners are deposited to a leading edge of the paper, the paper may wrap around the fixing roller to cause a jam. Accordingly, the video signal is also blocked by the reader A for the width of 2 mm of the paper at the leading edge.

Figure 3A:
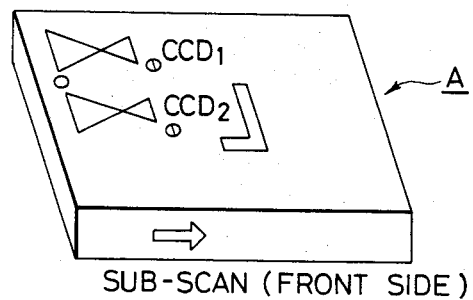
FIGS. 3a and 3b illustrate a main scan and a sub-scan of the reader and the printer of FIG. 2.
Figure 3B:
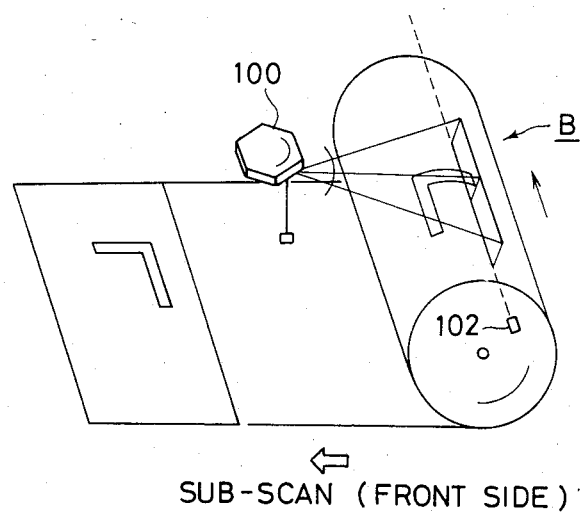

FIGS. 3a and 3b show the main scan and subscan directions of the reader A and the printer B an output image. The reader A scans from rear to front, and the printer B scans from front to rear, in the drawing. Numeral 102 denotes a photo-detector which detects the laser beam for each line scan. It produces a BD signal to be described below.

Figure 4:
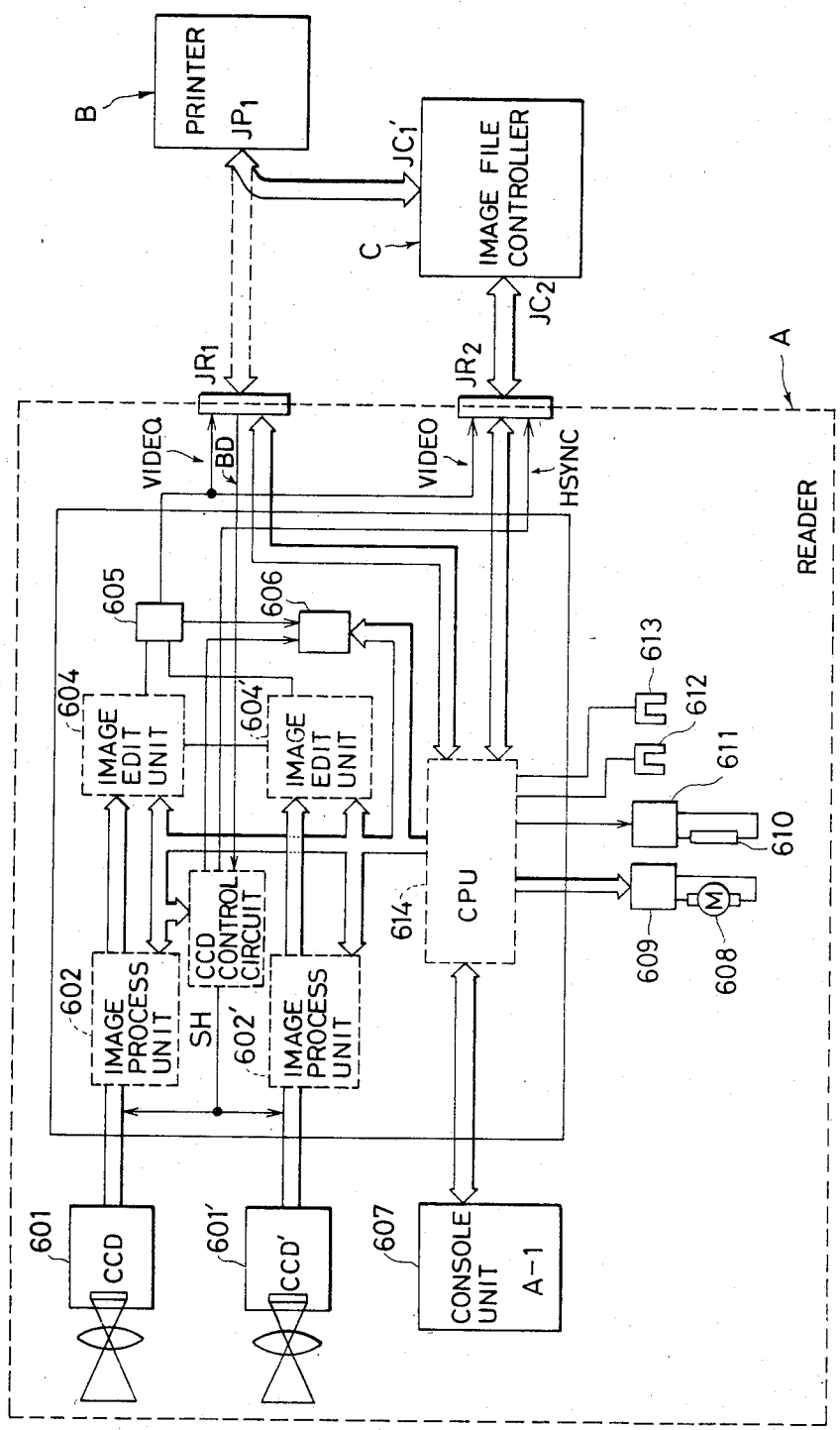

The reader unit A is now explained in detail with reference to a system block diagram of FIG. 4. When it is connected to the printer B, a connector $JR_1$ is connected to a connector $JP_1$ of the printer.

When it is connected to the image file controller C, connectors $JR_2$ and $JC_2$ are connected and the image file controller C stores and processes the image information sent from the reader A and sends the processed information to the printer B through connectors $JC_1'$ and $JP_1$.

CCD readers 601 and 601' each comprises a CCD, a CCD clock driver, a CCD signal amplifier and an A/D converter. A control signal to the CCD is generated by a CCD control signal generator 603 and supplied to the clock drivers of the CCD readers 601 and 601', which convert them to 6-bit digital image signals. Image processors 602 and 602' each comprises a sampling circuit for sampling the CCD output to allow the CPU 614 to control the intensity of a light source, a shading detector for a lens, a correction circuit thereof, a peak hold circuit for detecting a peak of the light intensity in the main scan to perform an AE function, and a quantization circuit for binarizing or ternarizing the 6-bit image data after the shading correction by slicing it with a level determined in accordance with a peak-hold value or a design pattern of a previous line or next-to-previous line. The image signals quantized by the image processors 602 and 602' are supplied to image editors 604 and 604'. The image editors 604 and 604' each has a two-line buffer memory. A memory capacity of one line is larger than twice of the number of pixels per line, i.e. 4752, because the data amount is doubled when it is expanded by a factor of 200% and the pixel data are written at the double sampling rate. Since reading and writing cannot simultaneously occur in one memory, the image data in the (N−1)th line is read out from the second memory while the image data in the N-th line is written into the first memory. The two-line buffer memories allow the above operation. In addition, a write address counter for writing the image data into the buffer memory, a read address counter for reading the image data and an address selector for selecting the address signals from those two counters are provided. The counter is of parallel load type which permits presetting of an initial value, which is loaded by the CPU to an I/O port. The CPU allows editing of the original document information by presetting an address corresponding to a main scan coordinate to the counter each time the sub-scan reaches a line corresponding to a trimming coordinate, in accordance with coordinate information indicated by a console unit. A joint detection shift register is provided for enabling white masking, block masking, white frame trimming and block frame trimming. The image data from the image editors are first produced from the editor 604 and then from the editor 604'. A synthesizer 605 smoothly selects those signals to produce a serial image data. A recognizer 606 detects a coordinate of the original sheet after pre-scan of the original sheet during pre-rotation period of the drum in the printer C after a copy button has been depressed. In addition, a shift register for detecting the continuous 8-bit image data to detect the original sheet, an I/O port and main/sub-scan counters are provided. A control unit 607 includes a key matrix, an LED, a liquid crystal and a liquid crystal driver. Numeral 608 denotes a DC motor for scanning the optical system, numeral 609 denotes a drive circuit therefor, numeral 610 denotes a fluorescent lamp for illuminating the original sheet, numeral 611 denotes a drive circuit therefore, numeral 612 denotes a photo-senser for detecting whether the optical unit is at a home position, and numeral 613 denotes a photo-sensor for detecting whether the optical unit is at a position to illuminate a leading edge of the original sheet. A CPU unit 614 comprises a CPU, a ROM, a RAM, a battery back-up circuit, a timer circuit and an I/O interface. The CPU unit 614 controls the console unit 607 to control the sequence in the reader in accordance with a control instruction from an operator and also controls the printer B by a command. Prior to the original sheet scan or during the original sheet scan, the image processors 602 and 602' set data for the counters of the image editors 604 and 604' in accordance with the command on the image processing from the console unit 607. Prior to the original sheet scan, the CPU controls the light intensity of the fluorescent lamp driver 611 in accordance with light intensity data from the image processor, presets a velocity data for the DC motor driver 609 in accordance with a magnification command, and collects the image joint data from the image editors 604 and 604' to calculate the joint amount.

FIG. 5 is a block diagram of an interface around the image reader. The interface signals are now explained with reference to FIG. 5.

A beam detect signal (BD) 202 functions to synchronize the output of each line of the video signal 215 with the rotation of the scanner 100 (FIG. 3) when the printer B is connected to the reader A, and it corresponds to a leading edge signal of each line of the image. A video signal 215 is an image signal and 4752 signals are produced per line with a pixel width of 55 ns. Each pixel can have up to three states, i.e. 0, ½ and 1. In the state 0, the signal is L for the 55 ns period, in the state ½, the signal is H for a first half 27.5 ns period and L for a second half 27.5 ns period, and in the state 1, the signal is H for the 55 ns period.

When the printer B is connected to the reader A and the image information is to be transmitted to the printer B, the video signal is supplied to the printer B in horizontal synchronization with the beam detect signal, and in other cases (such as when the image information is to be transmitted to a master unit such as the image file controller C), the video signal is outputted in horizontal synchronization with a HSYNC signal (347.2 μs) 203 generated in the reader A. The CCD controller 603 (FIG. 4) selects the horizontal synchronization a block diagram thereof is shown in FIG. 6.

The reader A determines by using the CPU 614 whether the horizontal synchronization is done by the signal BD from the printer B, the HSYNC 203a from the file controller C or the HSYNC 203b generated in the reader A, and supplies the determination result to a selector 250. In order to determine by using the CPU 614 whether the horizontal synchronization is done by the signal BD or the signal HSYNC, a key for selecting those modes is provided on the console unit 607 so that CPU 614 can determine the selected mode. When the printer B is connected to the reader A and the horizontal synchronization is done by the signal BD, the signal BD 202 from the printer B is supplied to the clock drivers of the CCD readers 601 and 601' through the selector 250, and the CCD readers 601 and 601' supply the 6-bit digital image data to the image processors 602 and 602' in synchronism with the signal SH.

When the image file controller C is connected to the reader A and the horizontal synchronization is attained by the HSYNC signals 203a and 203b, one of the following two methods is used.

When the HSYNC signal 203b is supplied from the reader A to the image file controller C, a plurality of image file controllers C are provided for one reader A' and a synchronization is attained among those image file controllers. The reader A generates a main scan synchronization pulse (347.2 μs) by the counter 251 of the horizontal synchronization selection circuit and supplies the clock drive signal SH to the CCD readers 601 and 601' through the selector 250, and supplies the HSYNC signal 203b to the image file controller C through a waveform shaper 255 so that the image file controller C attains the horizontal synchronization by the HSYNC signal. The counter 251 divides the clock of the oscillator 252 to produce the synchronization signal, referred to quasi-BD signal.

On the other hand, when the HSYNC signal 203a is supplied from the image file controller C, the signal SH is supplied through a waveform shaper 254 and the selector 250. In this case, the control circuit of the image file controller C is simpler than that of the previous case.

A video enable signal 216 is a period signal indicating that the 4752-bits image data is outputted. When the reader A and the printer B are connected, it is outputted in synchronism with the signal BD, and when the reader A and the image file controller C are connected, it is outputted in synchronism with the HSYNC signal 203a.

While the video enable signal is H, the reader A sends out the video signal and the video clock signal 217 and the receiving unit latches the video signal by the video clock.

The image signal has thus been described. FIG. 7 shows a horizontal synchronization timing.

Figure 8:
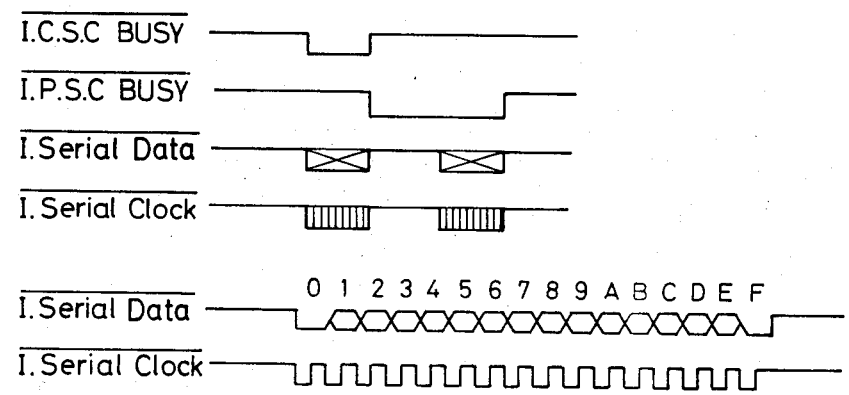

A protocol signal of the interface is now explained. A connect signal 201 indicates the connection of a low order module. For example, when $JP_1$ and $JR_1$, and $JC_1'$ and $JP_1$ are connected, it indicates that the reader and the file are connected to the printer B (low order module), and when $JC_2$ and $JR_2$ are connected, it indicates that the file and the reader A (high order module) are connected. A slave power ready signal 204 indicates whether a power to the low order module is turned on, and a controller power ready signal 214 indicates whether a power to the high order module is turned on. Signals S. DATA 209, S. CLOCK 210, CSC BUSY 211 and PSC BUSY 207 are serial signals for the protocol between the units (exchange of information for acknowledging and signalling the transmission between the units). The S. DATA 209 and S. CLOCK 210 are 8-bit protocal data and clock, respectively, which are on bilateral lines. The CSC BUSY 211 is produced when the high order unit (master) sends out the data and the clock to the lines. PSC BUSY 207 is produced when the low order unit (slave) sends out the data and the clock to the lines. Accordingly, they indicate the transmission directions of the S. DATA and the S. CLOCK. FIG. 8 shows a detail of a timing of the protocol of the interface.

The timing control signal for the interface signal is now explained. A V sync request signal 206 is produced when a leading edge of a paper fed by a print start signal 212 (a paper feed signal to the printer B when the printer B is connected) reaches an image write start position. The printer B produces this signal and stops the registration roller 18 (FIG. 2) and the reader A drives the registration roller 18 (FIG. 2) in synchronism with the VSYNC signal 213 (which is produced in synchronism with the beam detect signal from an image leading edge detection sensor 37b (see FIG. 9) or the HSYNC signal). The reader A sends out the video singal in synchronism with the VSYNC signal. A width of the VSYNC signal is equal to that of the video enable signal.

When the reader A and the image file controller C are connected, the V sync request signal is produced when the optical system of the reader A reaches a position to activate the image leading edge sensor 37b. After this signal, the image file controller C receives the video signal.

When the reader A is used as the master, the signal is supplied through $JR_1$ (FIG. 4), and when the reader A is used as the slave, the signal is supplied through $JR_2$. Accordingly, the CPU 614 must control the flow of the information.

Figure 9:
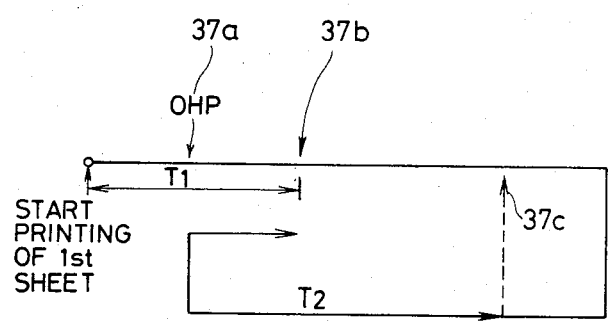

FIGS. 10 and 11 show flow charts of the control sequence. When the reader A is used as the master, that is, when $JR_1$ and $JP_1$ are connected, and the signal of the mode selection switch of the console unit (the signal indicating whether the reader A is used as the master or the slave) indicates the master mode, it is referred to as a case A. When $JR_2$ and $JC_2$ are connected and the signal of the mode selection switch indicates the slave mode, it is referred to as a case B. The reader A determines the mode prior to each scan to start one of different sequences. FIG. 9 shows the movement of the optical system. When the reader has one connector, the mode selection can be automatically done by connecting the printer or the files to the reader.

The case A where the reader is used as the master is explained. As shown in FIG. 9, three position sensors 37a, 37b and 37c are provided on the scan optical system of the reader A. An optical system home position sensor (which produces a signal DHP) is located at the leftmost as viewed from the front of the reader. The reader receives a true ready signal 205 (step 301) indicating no error in the printer and a true print request signal 208 (step 302) indicating a print ready state, and when the print button of the console unit of the reader A is depressed to instract the copy operation (step 303), the reader A sends out the print start signal 212 to the printer (step 304). A predetermined time $T_1$ later, the optical system of the reader A is driven (steps 305 and 306). The predetermined time $T_1$ is provided in order to absorb a lag time, because a time period from the send-out of the print start signal of the printer to feed the record paper to the output of the V sync request signal generated when the leading edge of the record paper in the printer reaches the image write position, is equal to or longer than a time period from the start of drive of the optical system of the reader to the arrival of the record paper to the image leading edge sensor 37b located at the reference position of the image. When the control circuit detects the path of the optical system by the sensor 37b (step 307), it sends out the V sync signal 213 (step 308) to vertically synchronize with the printer B (to drive the registration roller 18 to register the paper) and generates the image data signals (video, video clock and video enable) to print the image. The control circuit counts the number of video enable signals starting from the sensor 37b, and when the count reaches $\alpha$ corresponding to the first point, the second point or the third point depending on the cassette size of the printer or the magnification (step 309), the control unit requests an interruption to the CPU, turns off the optical system forward drive signal and turns on the backward drive signal to reverse the movement of the optical system (step 310). The print start sensor 37c is located in the backward path, and when the sensor 37c detects the optical system after the reversal (step 311), it is checked whether preset number of copies have been scanned (step 312), and if not, the print request signal is checked, and if it is true, the print start signal is generated to instruct to the printer the next paper feed.

The case B where the reader A is used as the slave is next explained.

The reader A checks if there is any internal error (step 401), and if not, it sends out the true ready signal 205 to the master such as the image file controller C (step 402). If there is an error, a non-true ready signal 205 is outputted (step 403). When the optical system is at the home position OHP (step 404), it means that the image output is ready and the print request signal 208 is sent to the master (file) (step 405). When the optical system is not at the home position, the print request signal 208 is turned off (step 406). When the drive switch is on, the above two signals are true and the image is to be read, the true print start signal is produced by the master. When the reader A detects the true print start signal (step 407), the optical system is driven from left to right (step 408), and when the optical system is detected by the sensor 37b (step 409), the V sync request signal is sent to the image file controller C as a vertical synchronization signal of the image, and the video, video clock and video enable signals are also sent out (step 401). Since the image file controller C has a page memory and the reader A sends the vertical synchronization signal V sync st, the control is facilitated. Similarly to the case A, the number of video enable signals from the sensor 37b is counted and when it reaches a predetermined count $\alpha$ (step 411), an interruption request is issued to the CPU and the optical system forward drive signal is turned off and the backward drive signal is turned on to reverse the optical system (step 412), and when the optical system is detected by the home position sensor 37a (step 413), the optical system is stopped and the process returns to the start point and the above steps are repeated (step 414).

In the case B, if the sensor 37b is at the image leading edge and the optical system is stationary, the reader does not start the send-out of the video signal simultaneously with the output of V sync request, and the video signal can be sent out by the input of V sync from the master. The V sync may be generated a predetermined time after the generation of the start signal such as start switch on in the master or after the input of the V sync request. The predetermined time corresponds to a time required for pre-processing and preparation of the file. Alternatively, the V sync may be generated by the master when the pre-processing and the preparation in the master are completed or where the file conditions are met. The file conditions include confirmation of stand-by of a head at a desired address of the file, and confirmation of start of write operation to the file.

In FIG. 5, when the file and the printer are connected, the file is used as the master. The file data are supplied to the printer to reproduce the image in the same signal synchronization relationship as that of the case where the reader and the printer are connected. The video data is outputted from the buffer mamory of the file in synchronism with signal BD of the printer. It is synchronously selected by the selection switch of the console unit of the file.

When the reader, the printer and the file are connected as shown in FIG. 5 and desired two of them are selected, the above synchronization and start relationships are selected. The selection command may be centrally executed by the selection in the console unit of the file or the reader, or by a switch in a separate work station.

What I claim is:

1. An image data processing apparatus comprising:
   means for generating image data in syncronism with synchronization signals;
   means for outputting internal synchronization signals;
   means for transmitting the image data generated by said generating means to an external apparatus; and
   means for selecting either the internal synchronization signals from said outputting means or external synchronization signals from the external apparatus in accordance with the external apparatus to which the image data is to be transmitted, and for supplying the selected synchronization signals to said generating means.

2. The apparatus according to claim 1, wherein said generating means is operable to generate the image data in synchronism with said synchronization signals on a line by line basis.

3. The apparatus according to claim 2, wherein said generating means is operable to read an image of an original document and generate the image data representing the image read.

4. The apparatus according to claim 2, wherein if the transmission destination of the image data is a printer for recording an image based on the image data on a line by line basis, said selecting means is operable to select the external synchronization signals synchronized with the image recording operation on a line by line basis.

5. The apparatus according to claim 2, further comprising means for producing reference signals, wherein said outputting means is operable to form the internal synchronization signals based on said reference signals.

6. An image data processing system comprising:
   means for generating image data in synchronism with synchronization signals, said generating means being provided with means for forming first synchronization signals;
   first processing means for processing the image data, which is generated by said generating means, in synchronism with said first synchronization signals; and
   second processing means for processing the image data, which is generated by said generating means, in synchronism with second syncrhonization signals, said second processing means being provided with means for forming said second synchronization signals;
   wherein said generating means is operable to generate the image data in syncrhonism with said first synchronization signals, when the image data is processed by said first procssing means, and said generating means is operable to generate the image data in synchronism with said second synchronization signals, when the image data is processed by said second processing means.

7. The image data processing system according to claim 6, wherein said generating means is operable to generate the image data in synchronism with said synchronization signals on a line by line basis.

8. The image data processing system according to claim 6, wherein said generating means is operable to read an image of an original document and generate the image data representing the image read.

9. The image data processing system according to claim 6, wherein said second processing means comprises means for recording an image based on the image data on a line by line basis, and said second synchronization signals are synchronized with the image recording operation on a line by line basis.

10. The image data processing system according to claim 6, wherein said generating means has means for producing reference signals, and said first synchronization signals are formed based on said reference signals.

11. The image data processing system according to claim 6, wherein said generating means has means for selecting either said first or second image processing means.

12. An image processing apparatus comprising:
    means for generating image data;
    means for forming, based on synchronization signals, clock signals synchronized with the generation of the image data by said generating means;
    means for transmitting the image data generated by said generating means and the clock signals formed by said forming means to an external apparatus; and
    means for outputting internal synchronization signals;
    wherein said forming means is operable to select either the internal synchronization signals or external synchronization signals from the external apparatus in accordance with the external aparatus to which the image data is to be transmitted, and to form the clock signals based on the selected synchronization signals.

13. The apparatus according to claim 12, wherein said generating means is operable to read an image of an original document and generate the image data representing the image read.

14. The apparatus according to claim 12, wherein said clock signals are transmitted during a period of time that the image data is generated by said generating means.

15. The apparatus according to claim 12, wherein if the external apparatus, to which the image data transmitted is a printer for recording an image based on the image data on a line by line basis, said forming means is operable to form the clock signals based on the external synchrqnization signals synchronized with the iamge recording operation on a line by line basis.

16. An image processing system comprising: means for generating image data in synchronism
    with clock signals, said generating means being provided with means for outputting first synchronization signals, and means for forming clock signals based on synchronization signals;
    first processing means for processing the image data, which is generated by said generating means, in synchronism with said clock signals; and
    second processing means for processing the image dat, which is generated by said generating means, in synchronism with said clock signals, said second processing means being provided with means for outputting second synchronization signals;
    wherein said forming means is operable to form the clock signals based on said first synchronization signals, in the event that the image data is processed by said first processing means, and said forming means is operable to form the clock signals based on said second synchronization signals, in the event that the image data is processed by said second processing means.

17. The system according to claim 16, wherein said generating means is operable to read an image of an original document and generate the image data representing the reading image.

18. The system according to claim 16, wherein said clock signals are transmitted during a period of time that the image data is generated by said generating means.

19. The system according to claim 16, wherein said second processing means is a means for recording an image based on the image data on a line by line basis, and said second synchronization signals are synchronized with the image recording operation on a line by line basis.

20. The system according to claim 16, wherein said generating means has means for selecting either said first or second image processing means.

21. An image processing apparatus comprising:

means for generating image data in accordance with a start signal;

means for transmitting the image data generated by said generating means to an external apparatus; and manual operable means for providing a start signal to start generation of the image data by said geneating means;

wherein said generating means is operable to perform image data generating operation in accordance with either the start signal from said manual operable means or a start signal from said external apparatus.

22. The apparatus according to claim 21, wherein said generating means is operable to read an image of an original document and generate the image data representing the reading image.

23. The apparatus according to claim 21, wherein if the transmission destination of the image data is a printer for recording an image based on the image data, said generating means is operable to generate the image data in accordance with the start signal from said manual operable means.

24. The apparatus according to claim 21 further comprising means for designating the transmission destination of the image data.

* * * * *

UNITED STATES PATENT AND TRADEMARK OFFICE
CERTIFICATE OF CORRECTION

PATENT NO. : 4,691,237

DATED : September 1, 1987

INVENTOR(S) : Haruo SHIMIZU

It is certified that error appears in the above-identified patent and that said Letters Patent is hereby corrected as shown below:

<u>IN THE DRAWINGS</u>

Figure 3a, "SUB-SCAN (FRONT SIDE)" should read
--MAIN SCAN (FRONT SIDE)--.

<u>COLUMN 1</u>

Line 18, "in" should read --is--.
Line 19, "is" should read --in--.
Line 67, "an other" should read --another--.

<u>COLUMN 2</u>

Line 25, "and FIGS. 10" should read
--and
    FIGS. 10-- (new paragraph).
Line 39, "cables FIG. 2" should read
--cables. FIG. 2--.
Line 46, "fluoresent" should read --fluorescent--.

<u>COLUMN 3</u>

Line 25, "there of" should read --thereof--.
Line 65, delete "an output".
Line 66, delete "image".

UNITED STATES PATENT AND TRADEMARK OFFICE
CERTIFICATE OF CORRECTION

PATENT NO. : 4,691,237

DATED : September 1, 1987

INVENTOR(S) : Haruo SHIMIZU

It is certified that error appears in the above-identified patent and that said Letters Patent is hereby corrected as shown below:

COLUMN 4

Line 33, delete "of" (first occurrence).

COLUMN 5

Line 4, "therefore," should read --therefor,--.

COLUMN 6

Line 55, "protocal" should read --protocol--.

COLUMN 7

Line 7, "sin-" should read --sig---.
Line 8, "gal" should read --nal--.
Line 46, "instract" should read --instruct--.

COLUMN 8

Line 34, "(step 401)" should read --(step 410)--.
Line 36, "st," should read --request,--.
Line 68, "mamory" should read --memory--.

UNITED STATES PATENT AND TRADEMARK OFFICE
CERTIFICATE OF CORRECTION

PATENT NO. : 4,691,237

DATED : September 1, 1987

INVENTOR(S) : Haruo SHIMIZU

It is certified that error appears in the above-identified patent and that said Letters Patent is hereby corrected as shown below:

COLUMN 9

Line 13, "syncronism" should read --synchronism--.
    Line 55, "syncrhonization" should read --synchronization--.
    Line 60, "syncrhonism" should read --synchronism--.

COLUMN 10

Line 34, "aparatus" should read --apparatus--.
    Line 51, "iamge" should read --image--.
    Line 53, "comprising: means" should read --comprising:
        means-- (new paragraph).
    Line 54, close up right margin.
    Line 63, "dat," should read --data,--.

COLUMN 12

Line 6, "geneating" should read --generating--.

Signed and Sealed this

Twelfth Day of January, 1988

*Attest:*

DONALD J. QUIGG

*Attesting Officer*      *Commissioner of Patents and Trademarks*